United States Patent
Hippen et al.

[11] Patent Number: 5,979,850
[45] Date of Patent: *Nov. 9, 1999

[54] CADDY FOR APPLIANCE

[75] Inventors: Jan Hippen, Portland, Oreg.; Paul Holbrook, Buffalo Grove; Iulius Lucaci, Wheeling, both of Ill.; Angelika I. Schubert-Belle, Portland, Oreg.

[73] Assignee: HP Intellectual Corp., Wilmington, Del.

[*] Notice: This patent is subject to a terminal disclaimer.

[21] Appl. No.: 09/058,225

[22] Filed: Apr. 10, 1998

[51] Int. Cl.[6] ................................ A47F 5/00
[52] U.S. Cl. ................ 248/309.2; D7/412; 366/249
[58] Field of Search .............. 248/310, 309.1, 248/309.2; 366/249, 129, 130, 241, 244, 246, 285, 286; 241/199.12, 199.11, 101.1, 101.2; D7/412, 379, 376, 386

[56] References Cited

U.S. PATENT DOCUMENTS

| | | | |
|---|---|---|---|
| D. 278,506 | 4/1985 | Kafka | D7/376 |
| D. 287,810 | 1/1987 | Osit | D7/412 |
| D. 290,218 | 6/1987 | Thomas | D7/412 |
| D. 291,767 | 9/1987 | Osit | D7/379 |
| D. 320,717 | 10/1991 | O'Brien | D7/384 |
| D. 332,722 | 1/1993 | Torbet et al. | D7/412 |
| D. 337,918 | 8/1993 | Littmann | D7/386 |
| D. 343,547 | 1/1994 | Levin | D7/386 |
| D. 345,080 | 3/1994 | Piret | D7/386 |
| D. 345,888 | 4/1994 | Joss et al. | D7/379 |
| D. 361,240 | 8/1995 | Hanig | D7/376 |
| D. 368,625 | 4/1996 | Ruttimann | D7/412 |
| D. 390,415 | 2/1998 | Hippen et al. | D7/412 |
| D. 391,116 | 2/1998 | Hippen et al. | D7/412 |
| 3,274,631 | 9/1966 | Spohr . | |
| 4,575,255 | 3/1986 | Kafka | 366/129 |
| 5,533,801 | 7/1996 | Safont et al. | 366/249 |

FOREIGN PATENT DOCUMENTS

3820007  8/1989  Germany .

*Primary Examiner*—Ramon O. Ramirez
*Assistant Examiner*—Tan Le
*Attorney, Agent, or Firm*—Barry E. Deutsch

[57] ABSTRACT

A caddy 30 for a hand mixer 32 includes a base 38 and a cover 40 which are joined to form a housing 36. The housing 36 is formed with a nest 74 having a pair of mounting posts 44 extending upward from a floor wall 76 of the nest. The mounting posts 44 are formed with a stem 54, an annular groove 56 and a head 58 which cooperate with accommodating biased fingers 116 and radially inward nubs 118 of the fingers to retain the mixer 32 with the caddy 30 upon assembly therewith. Openings 98 are formed in the caddy 30 to receive implement mounts 104, which are held with the caddy by biased fingers 63 and nubs 64 located within the openings. The caddy 30, with the hand mixer 32 and the implements 34, is transportable and may be stored when the mixer and implements are not in use.

12 Claims, 9 Drawing Sheets

FIG. 14

CADDY FOR APPLIANCE

BACKGROUND OF THE INVENTION

This invention relates to an caddy for an appliance, and particularly relates to a portable caddy for a hand mixer and the accessory implements used therewith.

A hand mixer is an example of a portable appliance which facilitates the preparation of food with relative ease. The portability of the hand mixer allows the user to be able to prepare the food without the necessity of considerable counter space required when using other types of appliances. Further, during a single food preparation session, such as preparing batter for a cake, the portable hand mixer can be set aside on a counter for brief periods, and then be recovered quickly and easily when use thereof is required.

In some instances, the hand mixer, and the implements used therewith, are stored separately and loosely in a drawer or cabinet when not in use. At times, the mixer is not stored in the same drawer or cabinet as the implements. When it is desired to use the mixer and implements, a time-consuming search mission is required to locate the mixer and the implements.

Therefore, there is a need for a facility to retain the mixer and the implements together during a period when the mixer is not being used but is being stored.

SUMMARY OF THE INVENTION

Therefore, it is an object of this invention to provide an easily accessible caddy for the storage of an appliance.

Another object of this invention is to provide a portable, lightweight caddy for the storage of an appliance.

A further object of this invention is to provide a caddy for the storage of an appliance and the accessory implements therefor.

Still another object of this invention is to provide a caddy which supports an appliance therewith to the extent that the assembly of the caddy and the appliance can be transported together by gripping the appliance.

With these and other objects in mind, this invention contemplates a caddy for an appliance which includes a housing, a nest formed on the housing and means formed in the nest for attaching an appliance thereto.

This invention further contemplates a caddy formed with a nest and a post extending from the nest for attaching an appliance to the caddy.

Other objects, features and advantages of the present invention will become more fully apparent from the following detailed description of the preferred embodiment, the appended claims and the accompanying drawings.

DETAILED DESCRIPTION OF THE PREFERRED EMBODIMENT OF THE INVENTION

Figure 1:
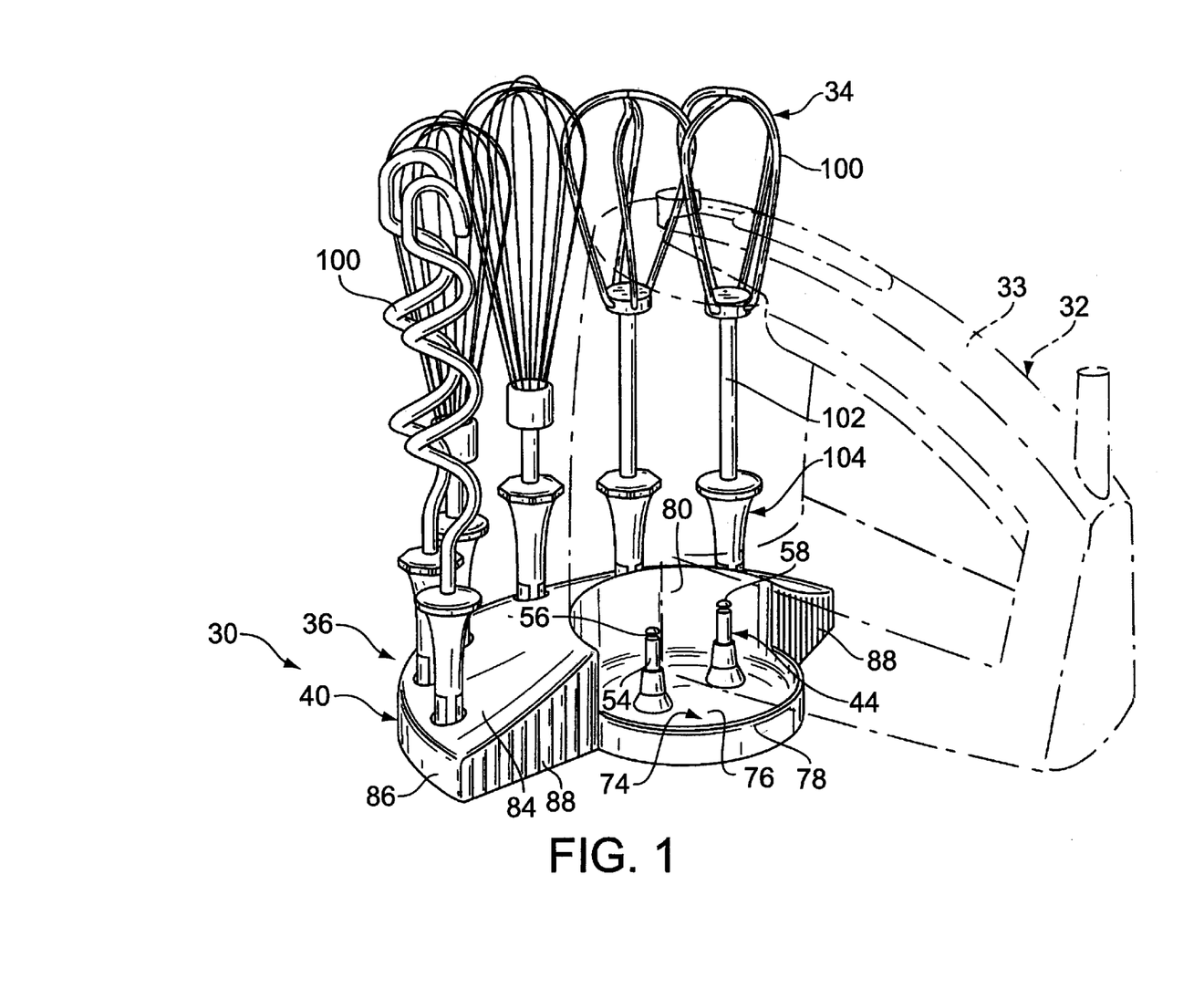
FIG. 1 is a perspective view showing a caddy for attachment to a hand mixer and accessory implements therefor, in accordance with certain principles of the invention.

Referring to FIG. 1, a caddy 30 for an appliance, such as a hand mixer 32 with a handle 33 as shown in phantom, is formed with attachment structure for supporting therewith the hand mixer and several accessory implements 34. The caddy 30 can be conveniently stored with the hand mixer 32 and implements 34 being retained together for quick and easy recovery.

Figure 2:
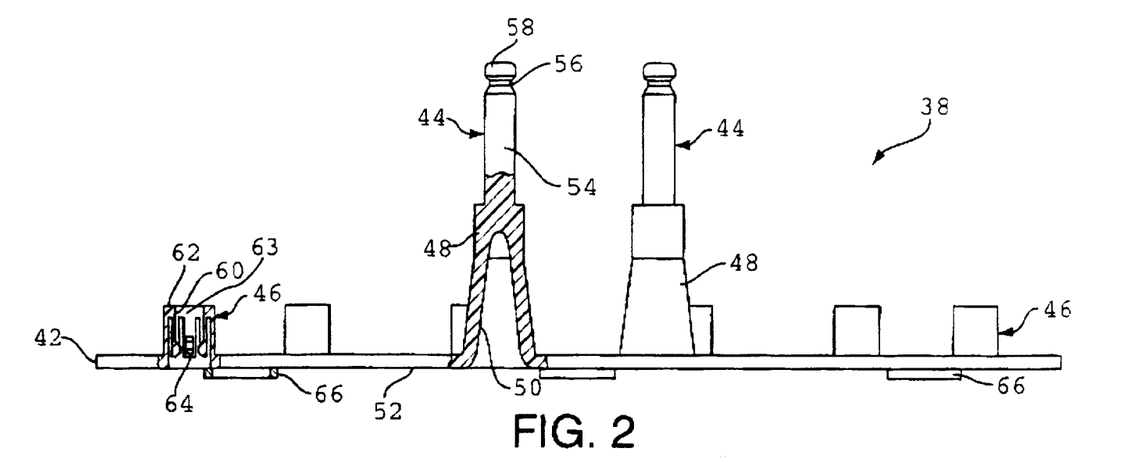
FIG. 2 is a side view of a base of the caddy of FIG. 1 with parts broken away showing attachment structures of the caddy in accordance with certain principles of the invention.
Figure 11:
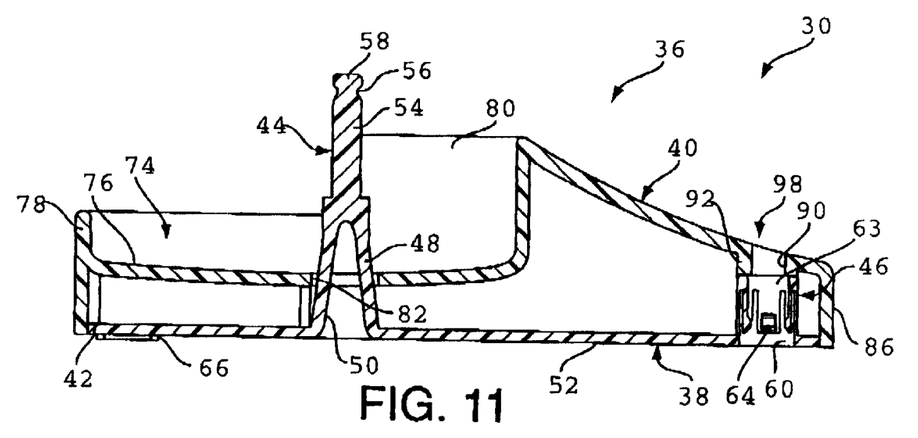
FIG. 11 is a sectional view showing the caddy of FIG. 1 in accordance with certain principles of the invention.

As shown in FIG. 11, the caddy 30 includes a housing 36 which is formed by an assembly of a base 38 and a cover 40, each of which is composed of a lightweight plastic material. Referring to FIG. 2, the base 38 includes a panel 42 formed integrally with a pair of appliance mounting posts 44 and a plurality of cylindrical sleeves 46. Each post 44 is formed with a truncated lower section 48 which has an opening 50 formed through a bottom surface 52 of the panel 42 and nearly to the upper portion of the lower section. Referring to FIGS. 1, 2, 8, 11, 13 and 14, each of the posts 44 is formed with a stem 54 which extends upward from the lower section 48 and is formed with an annular groove 56 near the upper end thereof, and with a head 58 at the upper end thereof.

Figure 3:
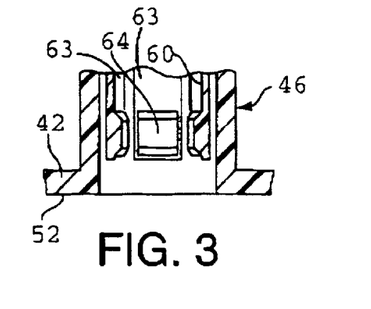
FIG. 3 is a sectional view of a portion of an attachment structure of the base of FIG. 2 for supporting accessory implements in accordance with certain principles of the invention.
Figure 4:
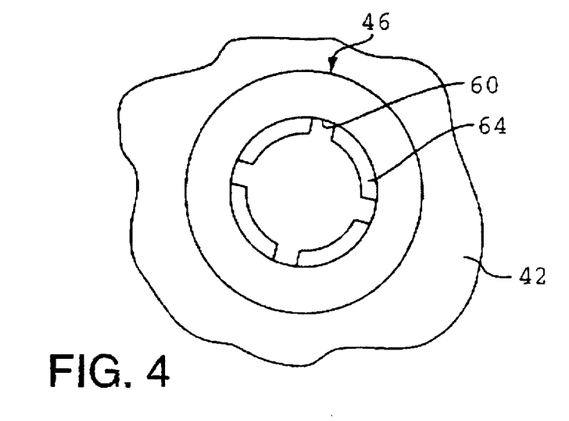
FIG. 4 is a top view of an enlargement of the attachment structure of FIG. 3 in accordance with certain principles of the invention.
Figure 5:
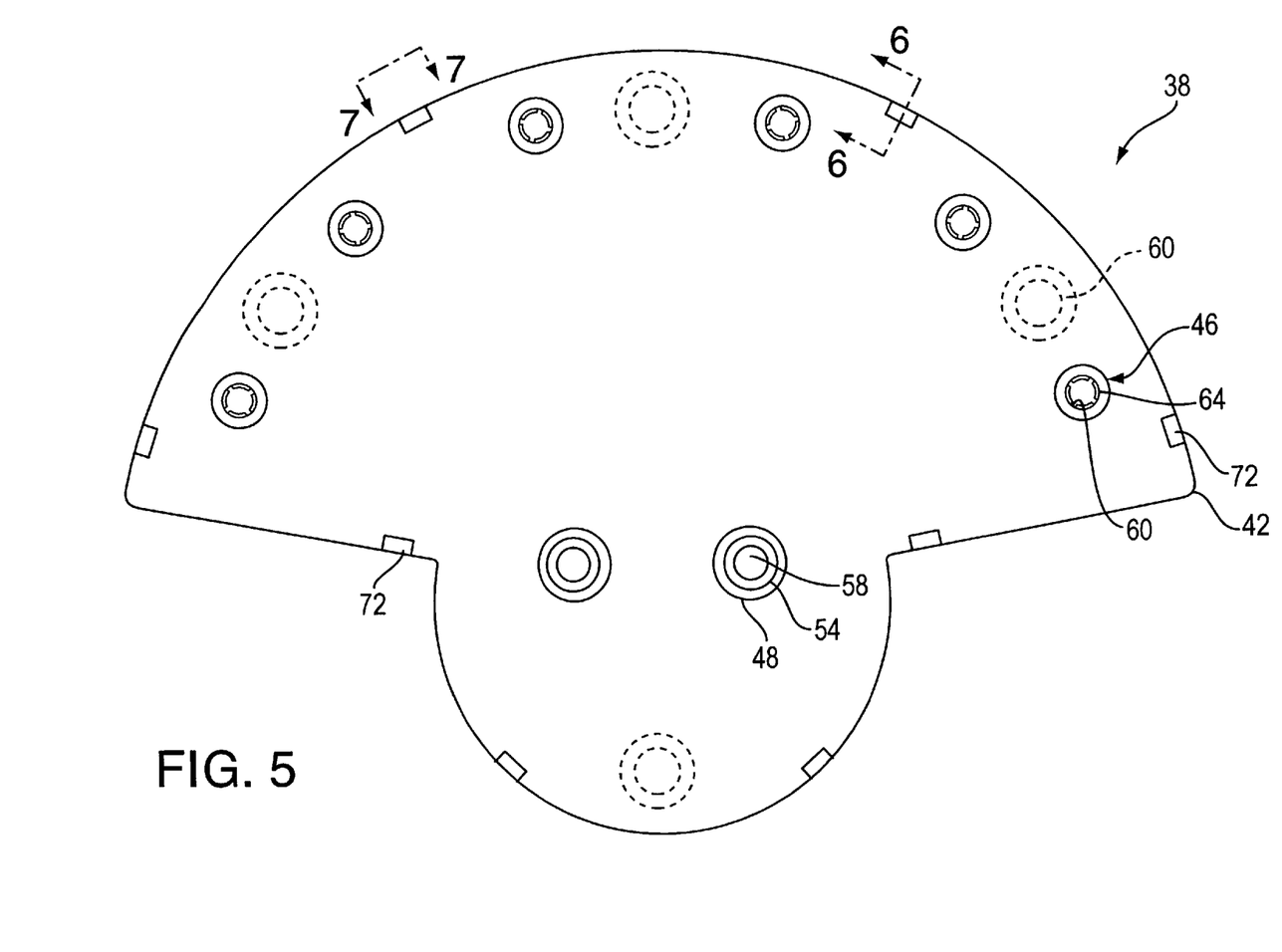
FIG. 5 is a top view showing the base of FIG. 2 in accordance with certain principles of the invention.

Each sleeve 46 is formed with an opening 60 which extends from the bottom surface 52 of the panel 42 fully through the sleeve at an upper end 62 (FIG. 2) thereof. A plurality of biased fingers 63 are formed radially inward from the wall of the opening 60 near the upper end 62 of each of the sleeves 46, as illustrated in enlarged views of FIGS. 3 and 4. The fingers 63 extend downward within the sleeves 46 toward the bottom surface 52 of the panel 42. The fingers 63 within each sleeve 46 are biased normally toward each other, and are formed near the bottom thereof with inward extending nubs 64. A plurality of cylindrical wells 66 are formed on, and extend outward from, the bottom surface 52 of the panel 42. Compliant discs (not shown) are inserted into the wells 66 and extend slightly out of the wells to form support feet for the caddy 30.

Figure 6:
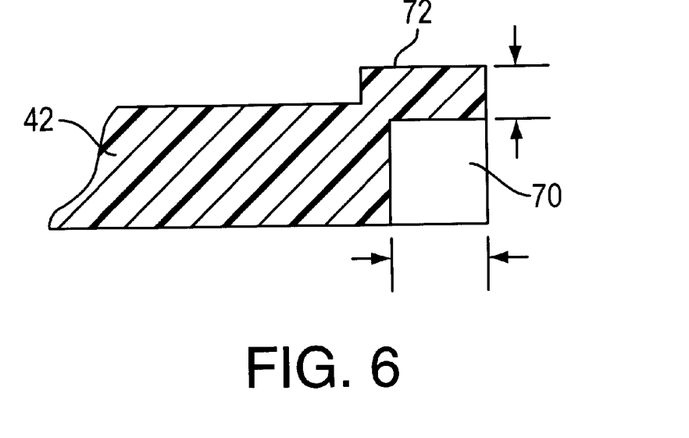
FIG. 6 is a sectional view taken along line 6—6 of FIG. 5 showing a matching assembly slot of the base of FIG. 2 in accordance with certain principles of the invention.
Figure 7:
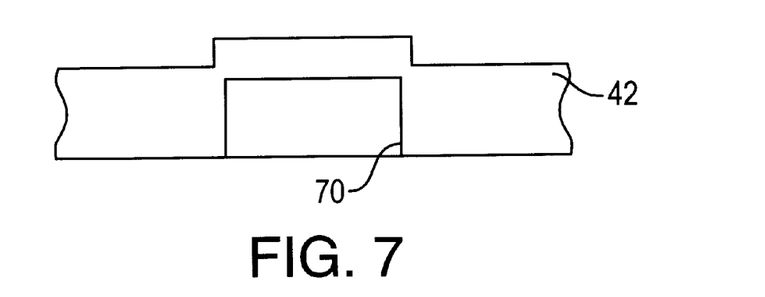
FIG. 7 is a front view taken along the line 7—7 of FIG. 5 showing the matching assembly slot of FIG. 6 in accordance with certain principles of the invention.
Figure 8:
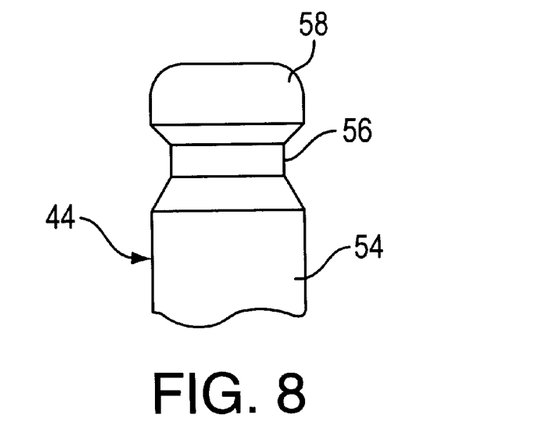
FIG. 8 is a an partial view of an upper end of an appliance mounting post of the caddy in accordance with certain principles of the invention.

As shown in FIGS. 6 and 7, the base 38 is formed with a plurality of matching assembly notches 70 around the perimeter of the panel 42, with a raised surface 72 being formed above each notch.

Figure 9:
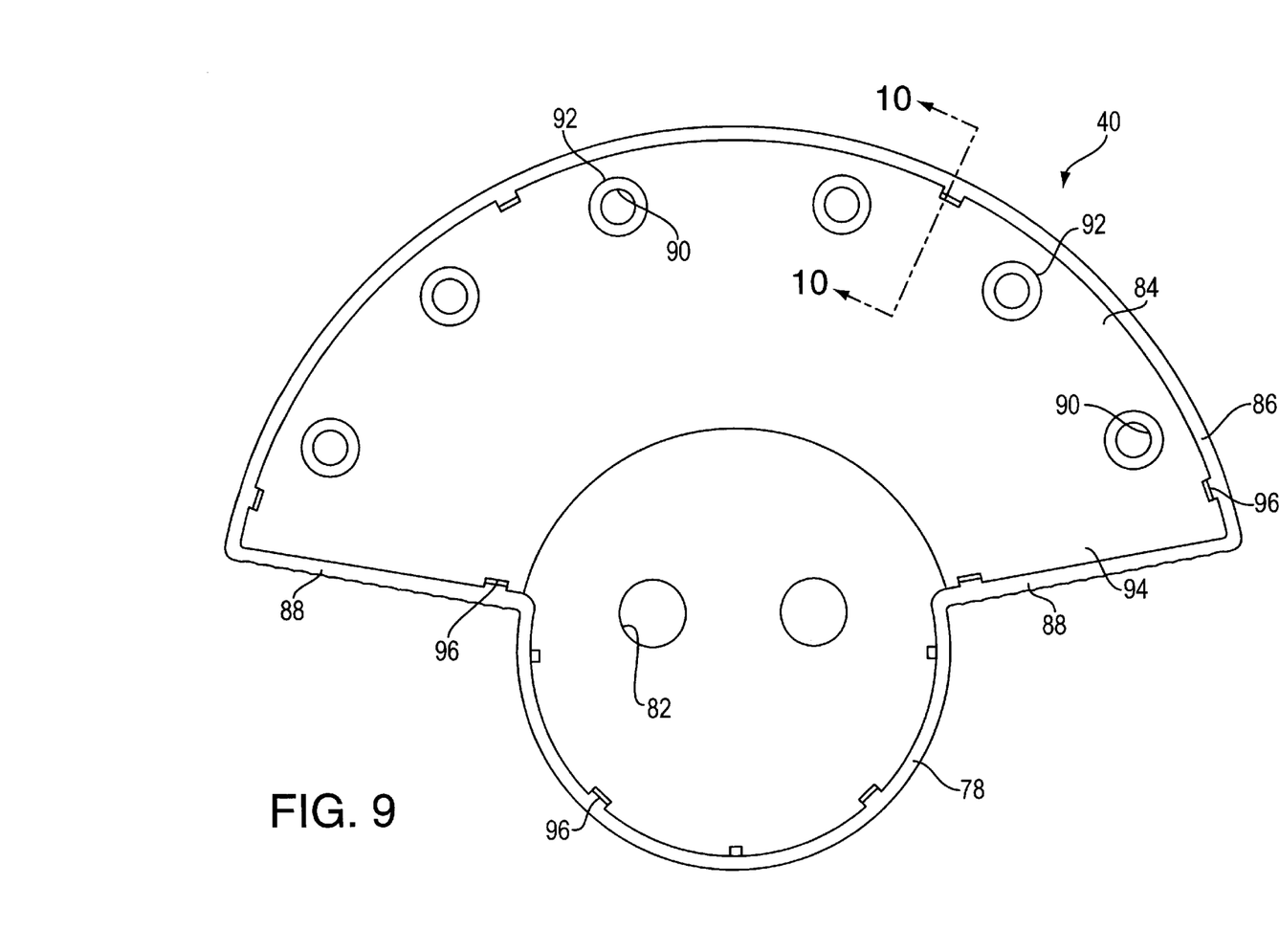
FIG. 9 is a top view showing a cover of the caddy of FIG. 1 in accordance with certain principles of the invention.
Figure 10:
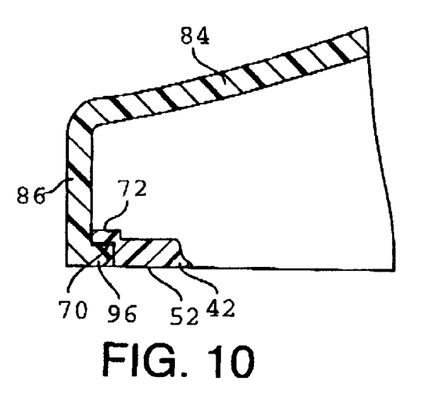
FIG. 10 is a partial sectional view taken along line 10—10 of FIG. 9 showing a matching assembly bar of the cover, and in assembly with the base of FIG. 2, in accordance with certain principles of the invention.

Referring to FIGS. 1 and 11, the cover 40 is formed with a circular nest 74 which includes a floor wall 76, a low front wall 78 and a high rear wall 80. A pair of openings 82 (FIGS. 9 and 11) are formed through the floor wall 76 of the nest 74. The cover 40 is also formed with a hand-fan shaped, top wall 84 which extends outward and slopes downward from an upper edge of the high rear wall 80 of the nest 74, and which joins a vertical wall 86 of the cover. The cover 40 is further formed with a pair of rippled walls 88 on each side of the nest 74 and contiguous with the top wall 84 and respective ends of the vertical wall 86. A plurality of openings 90 are formed in a radial pattern in the top wall 84 of the cover 40 near the vertical wall 86, and extend through a corresponding plurality of short cylindrical sleeves 92 formed in an undersurface 94 (FIG. 9) of the cover. As shown in FIGS. 9 and 10, a plurality of flexible tabs 96 are formed on an inboard side of the low front wall 78, the vertical wall 86 and the rippled walls 88, all at the bottom thereof, and correspond in number, shape and location with the notches 70 (FIGS. 6 and 7) of the base 38.

It is noted that the walls 78, 86 and 88 of the cover 40 form an apron which extends completely around the caddy 30. Further, as shown in FIGS. 10 and 11, the base 38 is recessed into the bottom of the cover 40, where the edge of the base is concealed by the lower portion of the apron of the cover.

As shown in FIG. 11, the base 38 and the cover 40 are assembled together to form the housing 36. As the base 38 and the cover 40 are assembled, the posts 44 extend, by about three-fourths the lengths thereof, through the openings 82 formed through the floor wall 76 of the nest 74 to assume the position shown in FIGS. 1 and 11. Also, the sleeves 92 are positioned on respective ones of the sleeves 46, whereby the openings 90 and 60, respectively, are axially aligned to form through holes 98 (FIG. 11) in various locations of the caddy 30.

As shown in FIG. 10, the flexible tabs 96 of the cover 40 locate within respective ones of the notches 70 of the base 38 to facilitate retention of the base with the cover. Other types of retention facilities could be used to retain the base 38 with the cover 40 without departing from the spirit and scope of the invention. For example, the upper surface of the panel 42 of the base 38 could be formed with a plurality of biased tabs having hooked ends which overhang the adjacent edge of the panel. The inboard side of the lower wall 78, the vertical wall 86 and the rippled walls 88 could be formed with notches into which the hooked ends of the biased tabs would insert to provide the retention facilities. If desired, screw fasteners could be used to enhance the retention of the base 38 with the cover 40.

Figure 12:
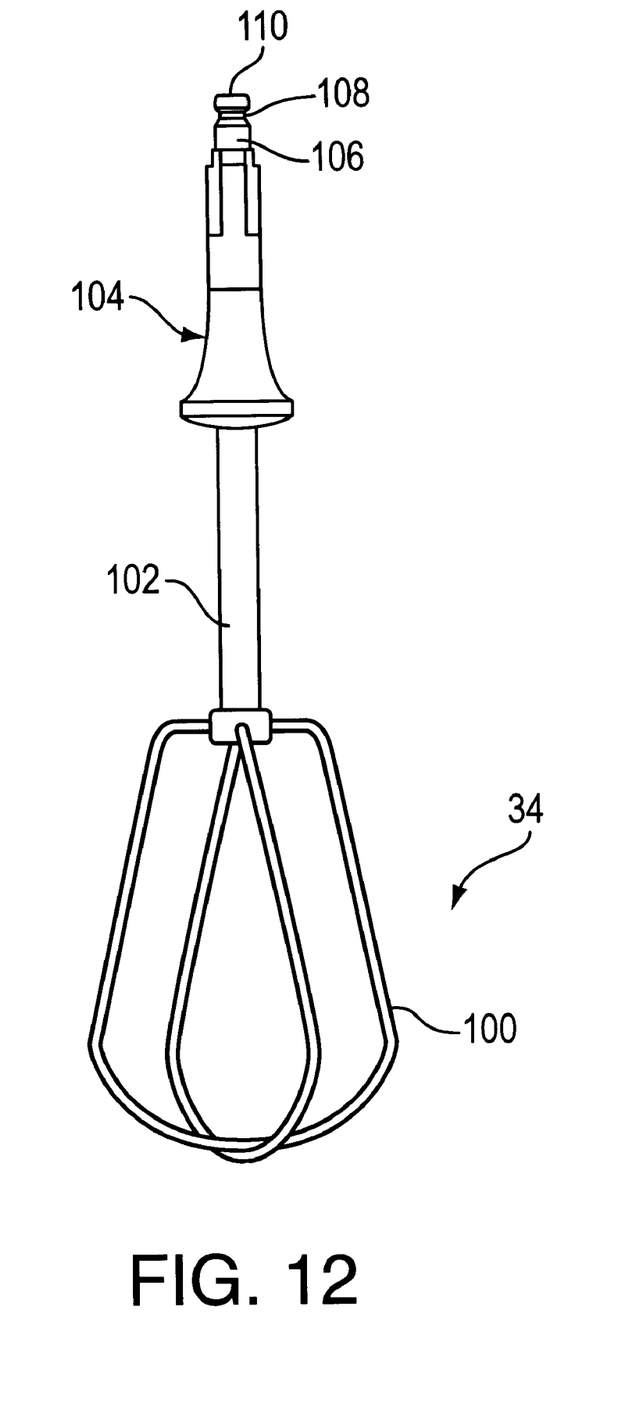
FIG. 12 is a side view of an accessory implement which can be mounted and stored on the caddy of FIG. 1.

Referring to FIG. 12, the illustrated mixer implement 34 is representative of the implements used with the hand mixer 32 and includes a food whipping or beating section 100, an intermediate stem 102 and an implement mount 104 for mounting the implement to the mixer. The implement mount 104 includes a short stem 106, an annular groove 108 and a head 110, all configured in the manner of the posts 44.

Figure 13:
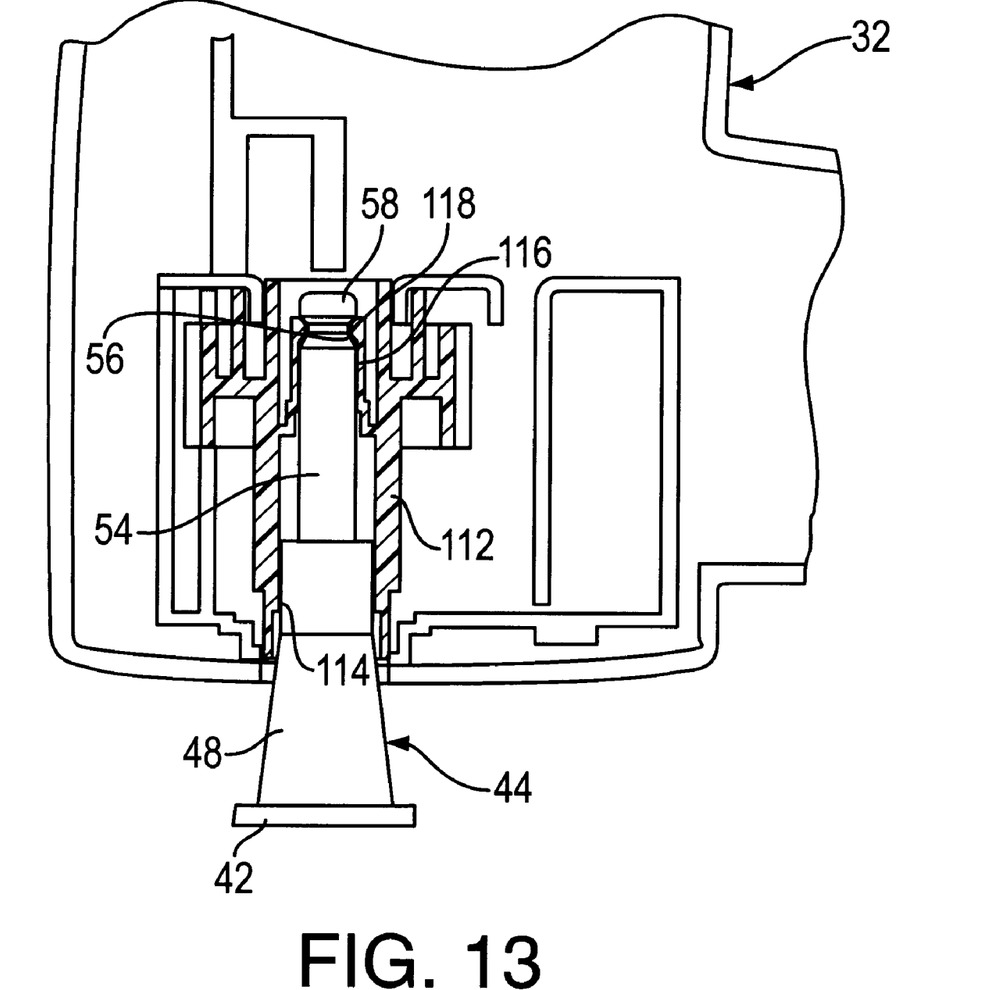
FIG. 13 is a partial view of the mounting post of FIG. 8 assembled within an accommodating receptor of the hand mixer.
Figure 14:
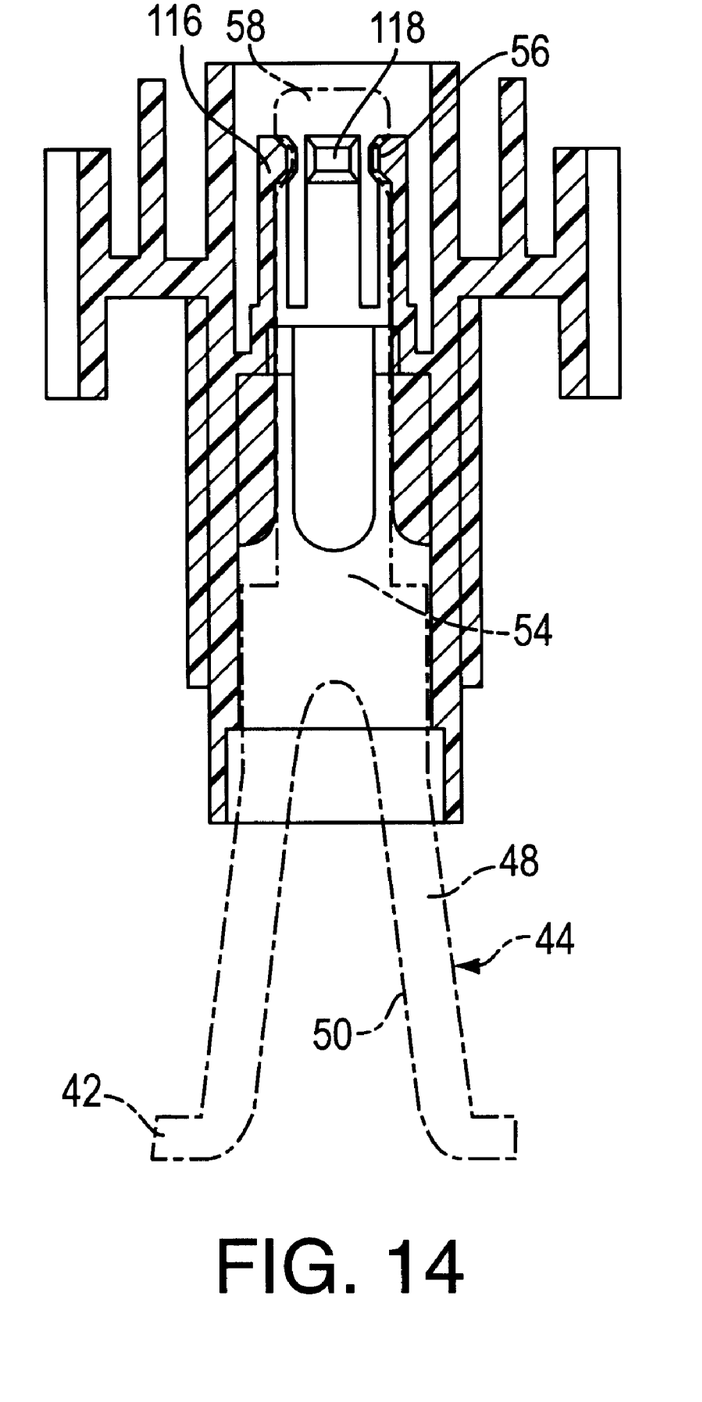
FIG. 14 is an enlarged sectional view showing the hand mixer receptor of FIG. 13 in assembly with the appliance mounting post of FIG. 8 in accordance with certain principles of the invention.

As shown in FIG. 13, the hand mixer 32 includes a rotatable frame 112 formed with an opening 114 and a plurality of biased fingers 116 located axially, at a prescribed depth, within the opening. Each of the fingers 116 are formed radially inward with a nub 118. Also illustrated in FIG. 13, and in the enlarged view of FIG. 14, one of the posts 44 of the caddy 30 is located within the opening 114 of the frame 112, and has been moved to a position where the nubs 118 are biasingly located within the annular groove 56 of the post to retain the hand mixer 32 with the caddy.

As shown in FIG. 1, the free end of the implement mount 104 of each of the implements 34 is inserted into a respective one of the openings 90 from the top of the cover 40 and into opening 60 of the base 38, where the nubs 64 of the biased fingers 63 are located in the annular groove 56 to retain the implement with the caddy 30.

The caddy 30 provides a lightweight, easily accessible, transportable carrier for retaining the hand mixer 32 and the implements 34 together for common storage thereof when the mixer is not in use. Further, the manner of firmly attaching the hand mixer 32 within the nest 74 of the caddy 30, by use of the posts 44 and the biased fingers 116 and nubs 118 of the mixer, facilitates the transporting and moving of the caddy, with the mixer and the implements 34, by gripping and holding the handle of the mixer.

In general, the above-identified embodiments are not to be construed as limiting the breadth of the present invention. Modifications, and other alternative constructions, will be apparent which are within the spirit and scope of the invention as defined in the appended claims.

What is claimed is:

1. A caddy for supporting an appliance having a portion with a prescribed shape, which comprises:
    a housing,
    a nest formed on the housing in a shape which is complementary to the prescribed shape of the portion of the appliance, said nest receiving the supported shaped portion of the appliance; and
    means formed in the nest for removably and securely attaching the appliance thereto.

2. A caddy for supporting an appliance and at least one work implement including a stern structure, the appliance including a portion having a prescribed shape and a stem receiving portion to hold the work implement, the caddy comprises:
    a housing;
    a nest formed on the housing in a shape which is complementary to the prescribed shape of the portion of the appliance which is to be placed into the nest; and
    means formed in the nest, having structure generally the same as the stem structure, for being assembled with the stem receiving portion of the appliance to removably and securely attach the appliance with the caddy for transport and handling therewith.

3. A caddy for supporting an appliance having a first portion comprising a prescribed shape and a second portion, for receiving and holding a stem of a work implement having structure complementary to the second portion, the caddy comprises:
    a housing;
    a nest formed on the housing in a shape which is complementary to the shape of the prescribed shape of the portion of the appliance which is to be placed into the nest; and
    a post formed in the nest having a post structure, which is generally the same as the stem structure, for being assembled with the second portion of the appliance lo removably and securely attach the appliance with the caddy for transport and handling with the caddy.

4. The caddy as set forth in claim 3, which further comprises:

the post being formed generally in a cylindrical shape and with an annular groove near the upper end thereof.

5. The caddy as set forth in claim 3, wherein the post is a first post and which further comprises:

a second post having the same shape as the first post and spaced therefrom.

6. The caddy as set forth in claim 3, which further comprises;

the housing formed with at least one opening having structure therein generally similar to the stem portion for receiving and supporting therein the stem of the work implement for transport and handling with the caddy.

7. The caddy as set forth in claim 6, wherein the structure in the opening comprises:

a wall having an upper end and a lower end;

a plurality of fingers having upper ends and lower ends, with the upper ends attached to the wall near the upper end of the wall;

the plurality of fingers extending within the opening toward the lower end of the wall, with the lower ends of the fingers being unattached; and the unattached ends of the plurality of fingers being biased toward each other for applying a retention force against the stem of the work implement received in the opening.

8. The caddy as set forth in claim 7, which further comprises:

a nub formed inward on each of the plurality of fingers near the bottom of each of the fingers.

9. The caddy as set forth in claim 3, wherein the housing comprises:

a base;

a cover mounted on the base;

the post formed on the base and extending therefrom; and the cover formed with an opening through which the post is located when the cover is mounted on the base.

10. The caddy as set forth in claim 9, which further comprises:

the nest formed in the cover; and the opening through which the post is located is formed through the nest of the cover such that the post extends from the nest.

11. The caddy as set forth in claim 3, wherein the housing comprises:

a base;

a cover mounted on the base; and the base being recessed within the cover to conceal an edge of the base.

12. The caddy as set forth in claim 11, wherein the cover comprises:

an apron formed around the cover; and a lower portion of the apron conceals the edge of the base.

* * * * *